(12) United States Patent
Rowen et al.

(10) Patent No.: US 9,407,053 B2
(45) Date of Patent: Aug. 2, 2016

(54) HYBRID ISOLATOR AND MODE EXPANDER FOR FIBER LASER AMPLIFIERS

(71) Applicants: Eitan Emanuel Rowen, Modiin (IL); Doron Barness, Kiryat Ono (IL); Jacob Lasri, Hod Hasharon (IL); Eran Inbar, Tel-Aviv (IL)

(72) Inventors: Eitan Emanuel Rowen, Modiin (IL); Doron Barness, Kiryat Ono (IL); Jacob Lasri, Hod Hasharon (IL); Eran Inbar, Tel-Aviv (IL)

(73) Assignee: V-GEN LTD., Tel-Aviv (IL)

( * ) Notice: Subject to any disclaimer, the term of this patent is extended or adjusted under 35 U.S.C. 154(b) by 0 days.

(21) Appl. No.: 14/636,509

(22) Filed: Mar. 3, 2015

(65) Prior Publication Data

US 2015/0249311 A1 Sep. 3, 2015

Related U.S. Application Data

(60) Provisional application No. 61/946,925, filed on Mar. 3, 2014.

(51) Int. Cl.
| | | |
|---|---|---|
| *H01S 3/00* | (2006.01) | |
| *H01S 3/067* | (2006.01) | |
| *G02B 6/27* | (2006.01) | |
| *G02B 6/14* | (2006.01) | |
| *H01S 3/094* | (2006.01) | |
| *H01S 3/0941* | (2006.01) | |

(52) U.S. Cl.
CPC .......... *H01S 3/0064* (2013.01); *G02B 6/2746* (2013.01); *H01S 3/06754* (2013.01); *H01S 3/06758* (2013.01); *G02B 6/14* (2013.01); *H01S 3/06704* (2013.01); *H01S 3/09415* (2013.01); *H01S 3/094003* (2013.01)

(58) Field of Classification Search
CPC ..... H01S 3/0064; H01S 3/06754; G02B 6/14; G02B 1/0955
USPC ........................................................ 359/337
See application file for complete search history.

(56) References Cited

U.S. PATENT DOCUMENTS

| | | | |
|---|---|---|---|
| 5,818,630 A | 10/1998 | Fermann et al. | |
| 5,825,950 A | 10/1998 | Cheng | |
| 5,848,203 A * | 12/1998 | Kawakami | G02F 1/093 385/11 |
| 7,433,558 B2 * | 10/2008 | Booth | G02B 6/4208 359/246 |
| 7,436,866 B2 * | 10/2008 | Vaissie | H01S 3/0057 372/102 |
| 7,733,922 B1 | 6/2010 | Munroe et al. | |
| 8,027,557 B2 | 9/2011 | Frith | |
| 8,711,471 B2 | 4/2014 | Liu et al. | |
| 2011/0249319 A1 * | 10/2011 | Savage-Leuchs | G02B 6/02347 359/341.1 |

FOREIGN PATENT DOCUMENTS

| | | |
|---|---|---|
| GB | 2293024 A | 3/1996 |
| WO | 00/48029 A1 | 8/2000 |

OTHER PUBLICATIONS

Extended European Search Report issued on Sep. 7, 2015 in connection with corresponding European Patent Application No. 15000600.5, 7 pages.

* cited by examiner

*Primary Examiner* — Mark Hellner
(74) *Attorney, Agent, or Firm* — Vedder Price, P.C.

(57) ABSTRACT

Mode expander isolator for a fiber laser amplifier comprising an optical fiber input, an optical fiber output, an isolator and at least one lens, the optical fiber input for coupling a first optical fiber with the mode expander isolator, the optical fiber output for coupling a second optical fiber with the mode expander isolator, the isolator being positioned between the optical fiber input and the optical fiber output for preventing back-reflected laser light from reaching the optical fiber input and wherein the isolator and the at least one lens form a free space mode expander.

16 Claims, 2 Drawing Sheets

HYBRID ISOLATOR AND MODE EXPANDER FOR FIBER LASER AMPLIFIERS

FIELD OF THE DISCLOSED TECHNIQUE

The disclosed technique relates to laser amplifiers in general, and to mode expanders in fiber laser amplifiers in particular.

BACKGROUND OF THE DISCLOSED TECHNIQUE

Fiber lasers using a given optical fiber diameter are usually limited in the peak power they can produce because as the peak power increases above a certain threshold for a given optical fiber diameter and length, unwanted non-linear laser phenomena, such as stimulated Raman scattering (herein abbreviated SRS) and stimulated Brillouin scattering (herein abbreviated SBS) begin to appear. Such phenomena can also cause laser damage since SRS and SBS can propagate inside a fiber laser and can be of sufficiently high intensity to damage or burn internal elements in the fiber laser. SRS can propagate forwards and backwards whereas SBS only propagate backwards. In order to increase the achievable peak power in a fiber laser while limiting the issue of unwanted non-linear laser phenomena, it is common practice to design fiber lasers having a series of amplification stages. Such fiber lasers allow high peak powers to be reached, such as a peak power of between 10-50 kilowatts (herein abbreviated kW) when using large mode area (herein abbreviated LMA) optical fibers having a core diameter of 25 micrometers (herein abbreviated μm). The diameter of the core of the optical fiber, also simply referred to as the core diameter, is increased in each stage, thereby enabling more energy to be propagated in a given amplification stage while not passing the peak power threshold above which unwanted non-linear laser phenomena become significant.

An increase in core diameter enables more laser modes to propagate through a fiber laser. Hence a typical fiber laser with a series of amplification stages might include a single mode (herein abbreviated SM) stage and an LMA stage. The SM stage allows only a single laser mode to propagate whereas the LMA stage may allow multiple laser modes to propagate. In the LMA stage care must be taken to prevent the excitation of higher order modes which can affect the beam quality of the laser light generated. As is known in the prior art, the SM stage and the LMA stage are coupled together via a mode field adapter (herein abbreviated MFA), which substantially allows laser light travelling down a smaller diameter core to propagate down a larger diameter core while exciting only the fundamental mode of the LMA fiber. MFAs are usually designed as an optical fiber having a tapered core which increases in diameter from the SM stage to the LMA stage. For example, the core diameter of the optical fibers used in the SM stage may have a diameter of X μm, whereas the core diameter of the optical fibers used in the LMA stage may have a diameter of Y μm, where X<=Y. The tapered core allows laser light propagating down the SM stage with core diameter X μm to adiabatically change to the LMA stage with core diameter Y μm. The MFA is designed such that one end can receive a core diameter of X μm and the other end can receive a core diameter of Y μm, thereby coupling the SM stage with the LMA stage.

In various industrial applications where amplified fiber lasers are used, such as during micro-machining and etching, the amplified fiber laser is often exposed to laser light reflected off a work surface back into the amplified fiber laser. Such reflected laser light can be referred to also as back-reflected light. The peak power of back-reflected light might be strong enough to cause damage to the amplified fiber laser. To avoid such a possibility of damage, an isolator may be placed at the output of the amplified fiber laser for reducing the amount of back-reflected light which may reenter the amplified fiber laser. In many cases the isolation at the output may not be sufficient to prevent internal damage. Moreover, laser light within the amplified fiber laser may reflect off of internal elements within its design. For example, amplified laser light within the fiber laser might reflect back from the isolator placed at the output, causing high peak power laser light to propagate backwards within the fiber laser amplifier and to even be amplified by it further. The optical fibers in the LMA stage may sufficiently handle such internally reflected high peak power laser light however the MFA and the SM stage may not. Using the example given above, laser light reflecting from the isolator will exhibit an increase in peak power as it propagates backwards from the LMA stage to the SM stage via the MFA by a ratio of $(Y/X)^2$. Such a peak power is sufficient to damage the MFA at minimum. The back-reflected light is thus amplified in the fiber laser amplifier, and the problem is most severe with high energy pulses, where the optical fiber propagating such pulses is pumped most aggressively. In practice, this limits the energy of commercially available fiber laser amplifiers using LMA cores to around 1 millijoule (herein abbreviated mJ).

Reference is now made to FIG. 1A, which is a schematic illustration of a prior art amplified fiber laser, generally referenced 10. Amplified fiber laser 10 includes an oscillator 16, a first amplification stage 12 and a second amplification stage 14 and is designed as a master oscillator power amplifier (herein abbreviated MOPA). In FIG. 1A, second amplification stage 14 is the last amplification stage and can be referred to as a booster or power amplifier. Oscillator 16 is coupled with first amplification stage 12. Oscillator 16 can be embodied as a seeder or seed laser. First amplification stage 12 includes a pumping diode 18, an actively doped optical fiber 20 and an isolator 22. Oscillator 16 and is coupled with actively doped optical fiber 20 via a SM optical fiber 30. Pumping diode 18 is coupled with actively doped optical fiber 20 via a multimode (herein abbreviated MM) optical fiber 31. Actively doped optical fiber 20 is coupled with isolator 22 via a SM optical fiber 30. Second amplification stage 14 includes a pumping diode 24, an actively doped optical fiber 26 and an isolator 28. Pumping diode 24 is coupled with actively doped optical fiber 26 via a MM optical fiber 35. Even though pumping diode 24 is shown as a single pumping diode, typically it may be embodied as a plurality of pumping diodes. Actively doped optical fiber 26 is coupled with isolator 28 via an LMA optical fiber 32. First amplification stage 12 is coupled with second amplification stage 14 via a mode field adapter (MFA) 36, as described above. MFA 36 is coupled with actively doped optical fiber 26 via an LMA optical fiber 32 and with isolator 22 via SM optical fiber 30.

Oscillator 16 generates low power laser light, either in a continuous wave (herein abbreviated CW) mode or a pulsed mode, on the order of a few milliwatts (herein abbreviated mW), having a peak power on the order of 1 watt. The laser light from oscillator 16 is fed into first amplification stage 12 and in particular into actively doped optical fiber 20. Pumping diode 18 is also fed into actively doped optical fiber 20, which amplifies the average power of the laser light to hundreds of milliwatts, with peak powers on the order of hundreds of watts. The amplified laser light is then passed through isolator 22 in the direction of MFA 36. In general, optical fibers 30 may be SM fibers. As shown, optical fiber 30 coupling isolator 22 with MFA 36 is a SM fiber. Isolator 22 protects oscillator 16, pumping diode 18 and actively doped optical fiber 20 from reflections coming from MFA 36, second amplification stage 14 or both.

MFA 36 adiabatically expands the mode of the laser light provided to it which is passed on to actively doped optical fiber 26. The light coming from pumping diode 24 is absorbed in actively doped optical fiber 26, which amplifies the laser light received from MFA 36, to an average power of tens of watts. In this respect pumping diode 24 pumps actively doped optical fiber 26. Optical fibers 32 are thus LMA fibers and can handle higher power laser light. The amplified laser light from actively doped optical fiber 26 is passed through isolator 28. Laser light is emitted from isolator 28, as shown by an arrow 33, towards a lens assembly 34. Lens assembly 34 is shown schematically and can be at least one collimating lens, at least one scanning mirror or at least one focusing lens, or a combination of the aforementioned. Lens assembly 34 can focus the emitted laser light to a sample (not shown) to be processed. Isolator 28 prevents or suppresses reflections from lens assembly 34 from returning into second amplification stage 14 and amplified fiber laser 10 in general. It is noted that FIG. 1 shows a MOPA configuration in which pumping diodes 18 and 24 pump actively doped optical fibers 20 and 26 in the forward or co-propagating direction. However the MOPA configuration shown can also be designed such that pumping diodes 18 and 24 pump actively doped optical fibers 20 and 26 in the backward or counter-propagating direction.

As second amplification stage 14 supplies high peak power and pulse energy, it must have a very large population inversion, thus having a very large gain for small signals, such as with back-reflected laser light. Laser light 33 which is back-reflected from a sample can pass through lens assembly 34 and into isolator 28. Whereas isolator 28 can suppress most of such back-reflected light, some of the high peak power back-reflected light can pass through isolator 28 into second amplification stage 14. This high peak power back-reflected light can then be further amplified by second amplification stage 14, propagating in the direction of MFA 36. Since MFA 36 includes a coupling between LMA fibers and SM fibers, the power of any back-reflected amplified laser light from isolator 28 and actively doped optical fiber 26 can be significantly higher than the power it can handle and MFA 36 can easily be damaged or burned as well as other elements in amplified fiber laser 10. MFA 36 is thus one of more sensitive elements in amplified fiber laser 10 and can also be a limiting factor for increasing the laser power, peak power or pulse energy being generated and circulated in amplified fiber laser 10. The remaining SM components in amplified fiber laser 10 are protected from any amplified back-reflected light by isolator 22, thus leaving MFA 36 as a weak link and being the least protected SM component in amplified fiber laser 10. An additional isolator (not shown) could be placed between actively doped optical fiber 26 and MFA 36 for suppressing amplified back-reflected light from reaching MFA 36, however such isolators tend to reduce beam quality, since they couple an LMA optical fiber to an LMA optical fiber. In addition, they tend to be expensive and add an additional component to amplified fiber laser 10.

It is noted that amplified fiber laser 10 is shown having two amplification stages, however this is merely schematic. An amplified fiber laser may include fewer (i.e. one) or more (i.e. three or more) amplification stages. Each amplification stage may be coupled with an MFA. As the number of amplification stages increase, the peak power of any back-reflected laser light from a sample can increase significantly if it back propagates through the amplification stages, each stage being further amplified.

Reference is now made to FIG. 1B, which is a schematic illustration of a mode field adapter (MFA), generally referenced 50, as is known in the prior art. MFA 50 is an optical fiber and includes a SM section 52, an LMA section 54 and a tapered section 56. It is noted that FIG. 1B is not drawn to scale and is merely schematic. SM section 52 is a SM optical fiber having a SM core 58, a SM cladding 60, and a numerical aperture (herein abbreviated NA) of the single mode. A SM core diameter is shown via an arrow 59. As mentioned above, FIG. 1B is not to scale, since an example of such a section might have a core diameter of 6 µm whereas the diameter of SM cladding 60 might be 130 µm. LMA section 54 is an LMA optical fiber having a LMA core 62, and an LMA cladding 64 and a NA of just the fundamental mode, which is less than the NA of the LMA optical fiber. An LMA core diameter is shown via an arrow 63. An example of such a section might have a core diameter of between 20-30 µm whereas the diameter of LMA cladding 64 might be 250 µm. As seen core diameter 63 is larger than core diameter 59. Core diameter 59 enables a single mode of light to travel therein whereas core diameter 63 enables more modes of light to travel therein. Tapered section 56 includes a tapered core 66 and a tapered cladding 68 and substantially increases the SM core and cladding of SM section 52 into the LMA core and cladding of LMA section 54. The tapering of tapered section 56 is designed to adiabatically expand the mode area of the SM section while decreasing the single mode NA to match that of the LMA optical fiber. As light passes from SM section 52 to LMA section 54, the peak power of the light remains constant. However since the mode area increases, the intensity of the light decreases. This is shown in FIG. 1B as arrows 70 and 72. An arrow 70 shows a higher intensity, yet smaller mode area in the SM optical fiber whereas an arrow 72 shows a lower intensity, yet larger mode area in the LMA optical fiber because of the larger diameters in LMA section 54. However in the reverse direction (not shown), where higher intensity light travels back from LMA section 54 to SM section 52, such as in back-reflected laser light, SM section 52 will substantially be damaged or burned if the intensity in the LMA fiber is sufficiently high, because SM section 52 reduces the mode area while increasing the intensity of the light. Thus MFA 50 increases the intensity of back-reflected laser light and if sufficiently high can cause internal laser damage. As mentioned above, the power threshold of SM section 52 can become a limiting factor in how much amplification is allowed in LMA section 54 for fear that too much of an amplification in laser light power will cause back reflections which will damage MFA 50. It would therefore be desirable to have a more robust and cost effective method to couple the amplification stages in a MOPA without the worry of damage or burn from higher intensity laser light reflecting back into lower intensity threshold elements and components.

Methods for coupling amplification stages in a MOPA or amplified fiber laser are known in the art. U.S. Pat. No. 5,818, 630 to Fermann et al., assigned to IMRA America, Inc., entitled "Single-mode amplifiers and compressors based on multi-mode fibers" is directed towards an optical amplification system for amplifying and compressing optical pulses in a multi-mode (MM) optical fiber. A single-mode is launched into the MM fiber by matching the modal profile of the fundamental mode of the MM fiber with a diffraction-limited optical mode at the launch end. The fundamental mode is preserved in the MM fiber by minimizing mode-coupling by using relatively short lengths of step-index MM fibers with a few hundred modes and by minimizing fiber perturbations. Doping is confined to the center of the fiber core to preferentially amplify the fundamental mode, to reduce amplified spontaneous emission and to allow gain-guiding of the fundamental mode. Gain-guiding allows for the design of systems with length dependent and power dependent diameters of the fundamental mode. To allow pumping with high-power laser diodes, a double-clad amplifier structure is used. For applications in non-linear pulse compression, self-phase modulation and dispersion in the optical fibers can be exploited. High power optical pulses may be linearly compressed using bulk optics dispersive delay lines or by chirped fiber Bragg gratings written directly into the SM or MM optical fiber. High power CW lasers operating in a single near-diffraction-limited mode may be constructed from MM fibers by incorporating effective mode filters into the laser cavity. Regenerative fiber amplifiers may be constructed from MM fibers by careful control of the recirculating mode. Higher power Q-switched fiber lasers may be constructed by exploiting the large energy stored in MM fiber amplifiers.

U.S. Pat. No. 8,027,557 to Frith, assigned to Nufern, entitled "Optical fiber laser, and components for an optical fiber laser, having reduced susceptibility to catastrophic failure under high power operation" is directed towards an optical fiber laser and its components. The optical fiber laser can comprise a fiber laser cavity having a wavelength of operation at which the cavity provides output light. The optical fiber laser also includes a mode field adapter and an optical fiber interconnection apparatus. The cavity includes an optical fiber that guides light having the wavelength of operation. The optical fiber has a first length and a second length, with the first length having a core having a V-number at the wavelength of operation and a numerical aperture. The second length has a core that is multimode at the wavelength of operation and that has a V-number that is greater than the V-number of the core of the first length optical fiber at the wavelength of operation and has a numerical aperture that is less than the numerical aperture of the core of the first length of optical fiber. At least one of the lengths comprises an active material that can provide light having the wavelength of operation via stimulated emission responsive to the optical fiber receiving the pump light. The optical fiber interconnection apparatus can be used to couple the first and second lengths of optical fiber, or can couple the fiber laser to an optical fiber power amplifier, which can be a multimode or single mode amplifier.

U.S. Pat. No. 8,711,471 to Liu et al., assigned to nLight Photonics Corporation, is directed towards a stable, single mode fiber amplifier. The amplifier consists of a seed source, a passive single clad multimode fiber, an active double clad multimode fiber or horn and a semiconductor laser pump source. The passive fiber is packaged on a mandrel with a compound radius of curvature such that high order modes in the fiber are stripped from the core leaving only the fundamental mode. This fiber is then spliced to a multimode active fiber of similar core diameter. By exciting only the fundamental mode of this active fiber, stable single mode amplification is achieved.

SUMMARY OF THE DISCLOSED TECHNIQUE

It is an object of the disclosed technique to provide a novel mode expander isolator for a fiber laser amplifier which overcomes the disadvantages of the prior art. In accordance with the disclosed technique, there is thus provided a mode expander isolator for a fiber laser amplifier including an optical fiber input, an optical fiber output, an isolator and at least one lens. The optical fiber input is for coupling a first optical fiber with the mode expander isolator and the optical fiber output is for coupling a second optical fiber with the mode expander isolator. The isolator is positioned between the optical fiber input and the optical fiber output for preventing back-reflected laser light from reaching the optical fiber input. The isolator and the at least one lens form a free space mode expander.

In accordance with another embodiment of the disclosed technique, there is thus provided a fiber laser amplifier including a laser source, an amplification stage and a mode expander isolator. The mode expander isolator is coupled between the laser source and the amplification stage. The mode expander isolator includes an optical fiber input, an optical fiber output, an isolator and at least one lens. The optical fiber input is for coupling an optical fiber of the laser source with the mode expander isolator. The optical fiber output is for coupling an optical fiber of the amplification stage with the mode expander isolator. The isolator is positioned between the optical fiber input and the optical fiber output for preventing back-reflected laser light from reaching the optical fiber input. The isolator and the at least one lens forms a free space mode expander.

BRIEF DESCRIPTION OF THE DRAWINGS

The disclosed technique will be understood and appreciated more fully from the following detailed description taken in conjunction with the drawings in which.

DETAILED DESCRIPTION OF PREFERRED EMBODIMENTS

The disclosed technique overcomes the disadvantages of the prior art by providing a novel mode expander isolator for simultaneously coupling amplification stages in an amplified fiber laser while also isolating the smaller core diameter optical fiber from back reflections from the larger core diameter optical fiber. The novel mode expander isolator is a single unit, thus being cost effective and robust.

Figure 2A:
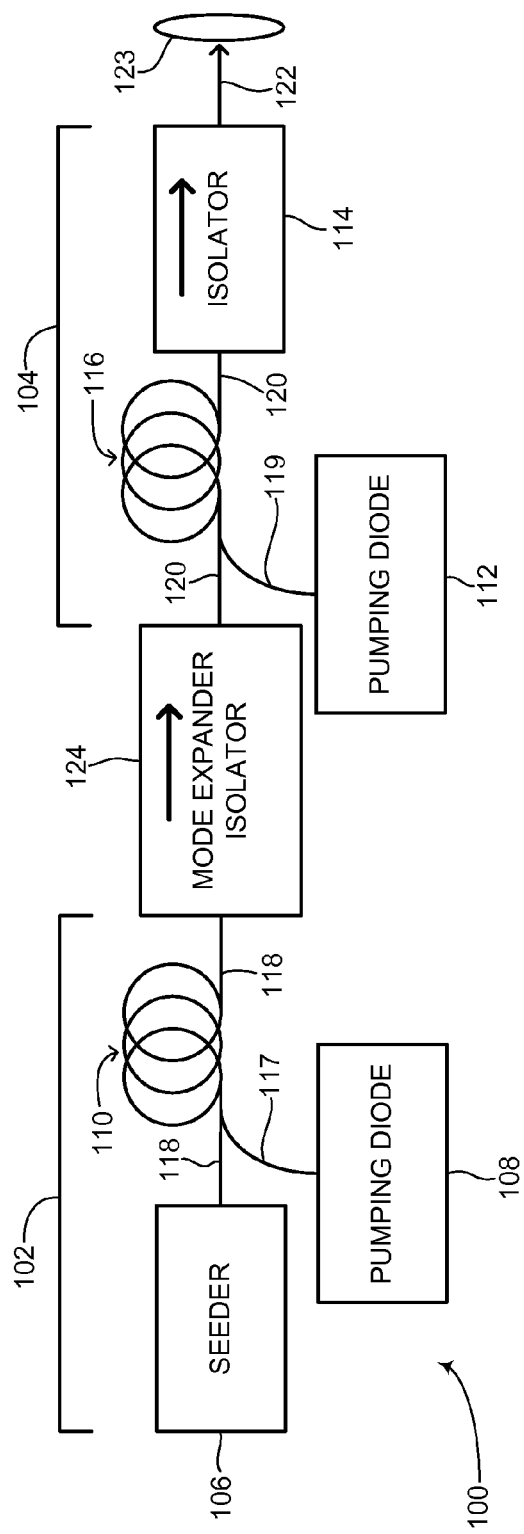
FIG. 2A is a schematic illustration a MOPA two-stage fiber laser amplifier, constructed and operative in accordance with an embodiment of the disclosed technique.

Reference is now made to FIG. 2A, which is a schematic illustration a MOPA two-stage fiber laser amplifier, generally referenced 100, constructed and operative in accordance with an embodiment of the disclosed technique. MOPA two-stage fiber laser amplifier 100, also referred to simply as fiber laser 100, includes a laser source 102 and an amplification stage 104. Laser source 102 includes a seeder 106, a pumping diode 108 and an actively doped optical fiber 110. Seeder 106 can be any kind of oscillator. Seeder 106 and pumping diode 108 are coupled with actively doped optical fiber 110 via optical fibers. Seeder 106 is coupled with actively doped optical fiber 110 via a SM optical fiber 118, whereas pumping diode 108 is coupled with actively doped optical fiber 110 via a MM optical fiber 117. Amplification stage 104 includes a pumping diode 112, an actively doped optical fiber 116 and an isolator 114. Amplification stage 104 can also include a plurality of pumping diodes (not shown) in place of pumping diode 112. Pumping diode 112 is coupled with actively doped optical fiber 116 via a MM optical fiber 119. Actively doped optical fiber 116 is coupled with isolator 114 via an LMA optical fiber 120. Laser source 102 is coupled with amplification stage 104 via a mode expander isolator 124, as described below. Mode expander isolator 124 is coupled with actively doped optical fiber 116 via an LMA optical fiber 120 and is coupled with actively doped optical fiber 110 via a SM optical fiber 118. It is noted that actively doped optical fibers 110 and 116 are shown by pumped respectively by pumping diodes 108 and 112 in the forward or co-propagating direction. Actively doped optical fibers 110 and 116 can be pumped respectively by pumping diodes 108 and 112 in the backward or counter-propagating directions as well. Laser source 102 is shown in FIG. 2A including a seeder coupled with an actively doped optical fiber being pumped via a pumping diode. According to the disclosed technique, laser source 102 can also be a Q-switched fiber resonator or a gain-switched fiber laser, including a gain-switched fiber laser with a laser ring cavity, as described in U.S. patent application Ser. No. 13/132,655, assigned to V-Gen Ltd.

Figure 1A:
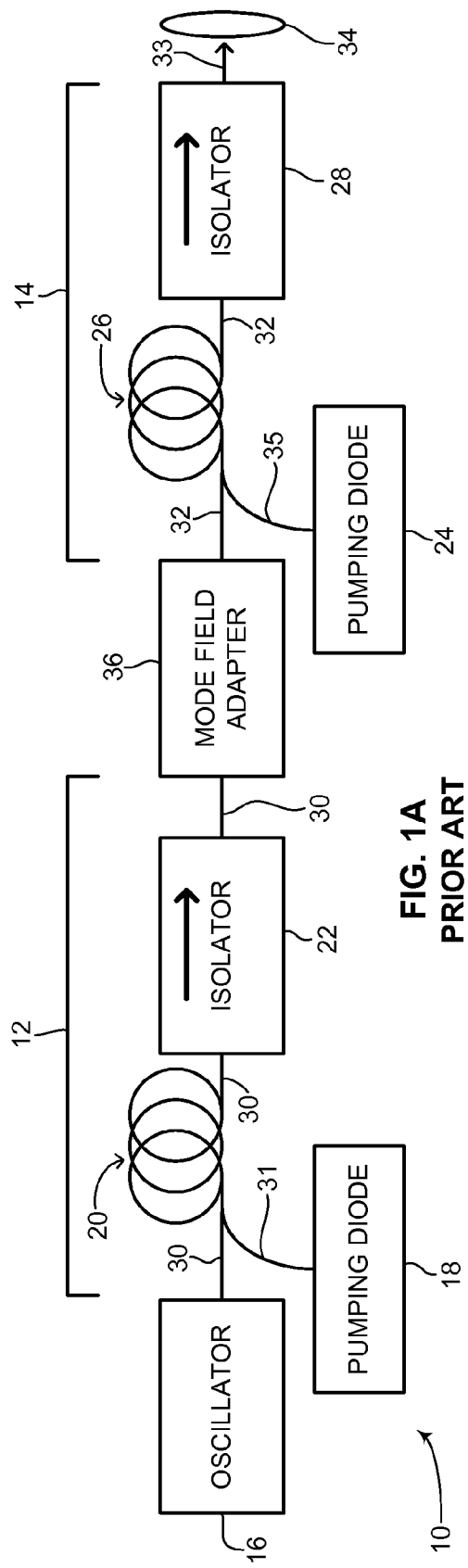
FIG. 1A is a schematic illustration of a prior art amplified fiber laser.
Figure 1B:
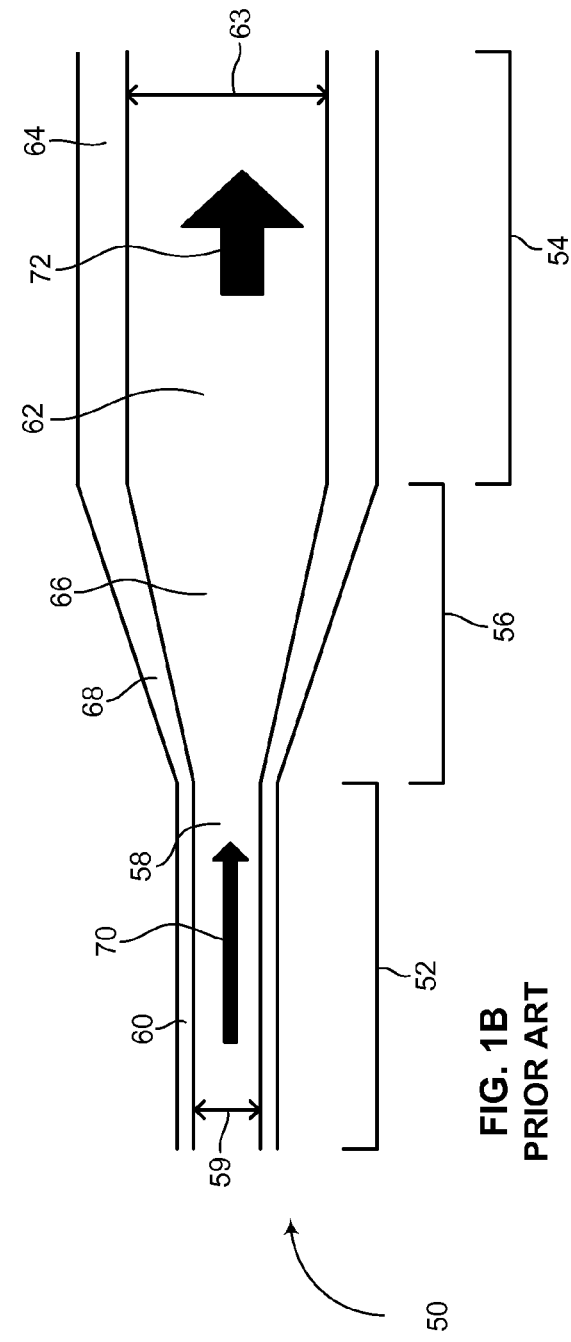
FIG. 1B is a schematic illustration of a mode field adapter, as is known in the prior art.

In laser source 102, seeder 106 generates low power laser light, either in a CW mode or a pulsed mode, typically on the order of few milliwatts, having a peak power on the order of 1 watt, with an energy ranging from 1-100 nanojoules. The laser light in laser source 102 may be SM laser light. The laser light from seeder 106 and pumping diode 108 is fed into actively doped optical fiber 110, which amplifies the average power of the laser light to between 100 mW to 1 watt on average, having a peak power on the order of 100-1000 watts, with an energy ranging from 0.1-10 microjoules. The amplified laser light is then passed to mode expander isolator 124. In general, optical fibers 118 are SM fibers and may have, for example, a core diameter of 6 µm. Mode expander isolator 124 uses an imaging system (not shown) to image the mode of the SM input fiber to the LMA output fiber. Amplification stage 104 amplifies the laser power to typically between 10-50 watts on average, having a peak power on the order of 10-50 kilowatts, with a pulse energy ranging up to 3 millijoules. The amplified laser light from actively doped optical fiber 116 is passed through isolator 114 and then emitted to a lens assembly 123, as shown by an arrow 122. Lens assembly 123 manipulates the amplified laser light, for example, towards a sample (not shown) for processing. Lens assembly 123 can include at least one a collimating lens, a scanning mirror and a focusing lens. Isolator 114 suppresses reflections from lens assembly 123 from returning into amplification stage 104 and amplified fiber laser 100 in general. Mode expander isolator 124 substantially prevents higher intensity back reflections from amplification stage 104 reaching laser source 102 while simultaneously changing the mode diameter from the SM fiber mode diameter to the LMA fiber mode diameter. The configuration of amplified fiber laser 100 enables improvements in reliability and an increase in peak power in the emitted laser light as shown by arrow 122 over the prior art. The inclusion of an isolator into a mode expander prevents and suppresses high intensity back-propagating laser light in any of the SM optical fibers in amplified fiber laser 100, thus removing the weak link MFA shown above in FIGS. 1A and 1B. In terms of pulse energy, a significant increase is possible using the disclosed technique. Whereas amplified fiber laser 10 (FIG. 1A) can generate laser light having a pulse energy of around 1 millijoule, amplified fiber laser 100 can generate laser light having a pulse energy of approximately 3 millijoules.

Figure 2B:
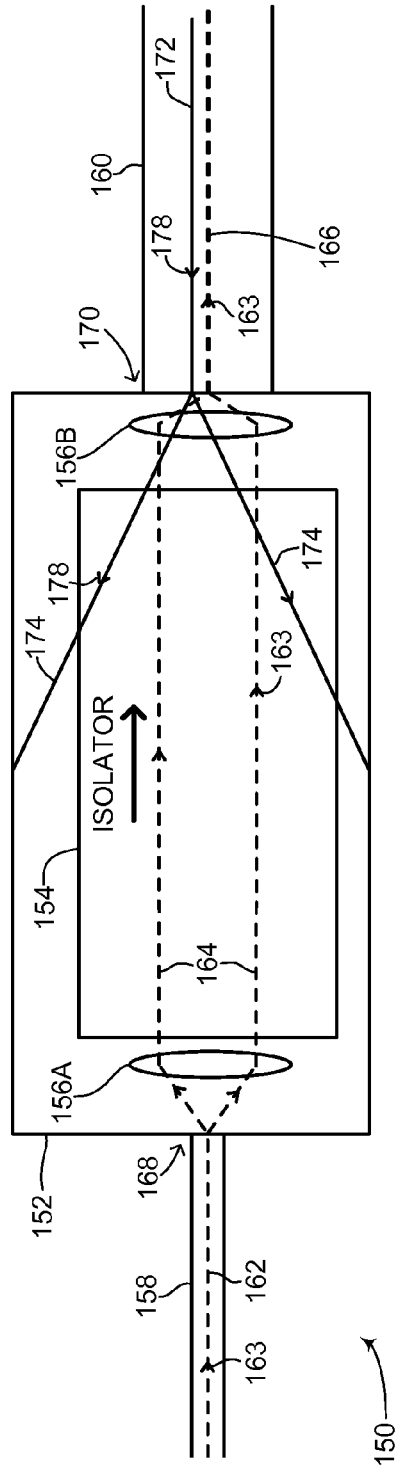
FIG. 2B is a schematic illustration of a mode expander isolator, as used in FIG. 2A, constructed and operative in accordance with another embodiment of the disclosed technique.

Reference is now made to FIG. 2B, which is a schematic illustration of a mode expander isolator as used in FIG. 2A, generally referenced 150, constructed and operative in accordance with another embodiment of the disclosed technique. FIG. 2B shows a mode expander isolator 152 which includes an isolator 154, at least one input lens 156A, at least one output lens 156B, an optical fiber input 168 and an optical fiber output 170. Optical fiber input 168 enables an optical fiber of a first core diameter to be coupled with mode expander isolator 152 and optical fiber output 170 enables an optical fiber of a second core diameter to be coupled with mode expander isolator 152. In general, the first core diameter is smaller than the second core diameter. Standard prior art isolators include an optical fiber input and an optical fiber output having the same core diameter. As shown, a SM optical fiber 158 is coupled with optical fiber input 168 and a LMA optical fiber 160 is coupled with optical fiber output 170. It is noted that at least one of at least one input lens 156A and at least one output lens 156B are optional components, i.e. mode expander isolator 152 requires at least one lens.

At least one input lens 156A and at least one output lens 156B are respectively positioned substantially near optical fiber input 168 and optical fiber output 170, thus forming a free space mode expander. In one embodiment of the disclosed technique, at least one input lens 156A and at least one output lens 156B are selected and designed such that a SM laser light beam 162 expands from the diameter of SM optical fiber 158 to that of the fundamental mode of LMA optical fiber 160. In addition the numerical apertures of the modes are selected to match the corresponding optical fibers. This can be achieved for example by at least one input lens 156A collimating a laser light beam 164 inside isolator 154 and at least one output lens 156B focusing it into LMA optical fiber 160. In this embodiment, the ratio between the focal lengths of at least one input lens 156A to at least one output lens 156B will be roughly equal to the ratio of the core diameters of SM optical fiber 158 to LMA optical fiber 160. As shown via laser light beam 164, at least one input lens 156A and at least one output lens 156B are designed to form a free space mode expander, thereby matching the mode of the SM optical fiber to that of the LMA optical fiber. At least one output lens 156B focuses the mode expanded laser light into LMA optical fiber 160, thereby enabling laser light 166 to continue propagating in the fundamental mode of LMA optical fiber 160. A plurality of arrow heads 163 shows the direction of forward propagation of laser light through mode expander isolator 152.

FIG. 2B also shows how isolator 154 suppresses and prevents laser light propagating backwards from LMA optical fiber 160 towards SM optical fiber 158, shown by a plurality of arrow heads 178. High intensity backwards propagating laser light 172 in LMA optical fiber 160 which propagates backwards towards at least one output lens 156B is shifted by isolator 154 such that laser light 174 propagating backwards through isolator 154 is not focused towards optical fiber input 168, as shown schematically in FIG. 2B. Isolator 154 thus prevents high intensity back-reflected laser light from reaching SM optical fiber 158 while simultaneously enabling laser light from SM optical fiber 158 to mode expand into the fundamental mode of the LMA fiber. At least one input lens 156A and at least one output lens 156B may each be single lenses or a plurality of lenses formed into a lens assembly (not shown) or optical system (not shown). At least one input lens 156A and at least one output lens 156B image the light from SM optical fiber 158 to LMA optical fiber 160 while matching the mode diameter. At least one input lens 156A, at least one output lens 156B, the lens assembly and the optical system mentioned above may be embodied as fiber lenses, ball lenses, gradient-index (herein abbreviated GRIN) lenses, spherical lenses, aspherical lenses and the like. Isolator 154 manipulates any back-reflected laser light coming from LMA optical fiber 160 such that it will not cause damage to the optical fiber coupled with optical fiber input 168. This can be achieved using a number of different embodiments according to the disclosed technique. In one embodiment, isolator 154 may include an aperture (not shown) around at least one input lens 156A to absorb or deflect the back-reflected light that is separated by isolator 154 from the forward propagating laser light. Isolator 154 deflects any back-reflected laser light, as schematically depicted in FIG. 2B. Isolator 154 may be a polarization maintaining (herein abbreviated PM) isolator which might include a Faraday rotator (not shown). At least one polarizing beamsplitter (not shown) and at least one polarizer (not shown) are used to separate laser light propagating through isolator 154 in a forward direction from back-reflected laser light propagating through isolator 154 is a backwards direction. Isolator 154 may also be a non-PM isolator which might include a Faraday rotator (not shown) and a plurality of birefringent crystals (not shown). The birefringent crystals direct and displace laser light in different directions depending on the direction of propagation of the laser light. Other embodiments are possible in which the spot size of back-reflected laser light is controlled such that it is not focused in a manner than may cause damage. Isolator 154 may also include an absorber (not shown) for deflecting back-reflected laser light away from optical fiber input 168. As mentioned above, at least one input lens 156A or at least one output lens 156B is optional. In an embodiment without one those lenses, a single lens (not shown) may be used to match the mode of the SM optical fiber to that of the fundamental mode of the LMA optical fiber. This can be achieved using various lens assemblies inside isolator 154 which is a matter of design choice known to the worker skilled in the art. For example, at least one diffractive element and at least one refractive element can be used for shaping the mode of optical fiber input 168 to match a specific higher order mode of optical fiber output 170.

The disclosed technique reduces the number of elements for mode expansion and back reflection isolation while also increasing ease of integration of mode expander isolator 152 into a fiber laser amplifier. According to the disclosed technique, the prior art element having the lowest power threshold for damage has been removed, thus enabling a fiber laser amplifier to extract higher power, higher peak power and higher laser pulse energy from a given fiber laser setup. The disclosed technique has been described above using the example of a two-stage MOPA. However, the disclosed technique can be used in any kind of fiber laser setup, such as a MOPA configuration with a single amplification stage, a multi-stage fiber laser amplifier, and even optical fiber devices that are not strictly lasers, such as amplified spontaneous emission (herein abbreviated ASE) amplifiers. The fiber laser setup of the disclosed technique can be used with polarized lasers or un-polarized lasers. In addition, the disclosed technique above has been described in a fiber laser amplifier which converts SM fiber mode light to the fundamental mode of an LMA optical fiber, however the disclosed technique is not limited to those modes and can be used in any fiber laser amplifier in which the power of laser light from a laser source in increased in at least one amplification stage, such as an increase in pulse energy from one amplification stage to a second amplification stage. This can include SM to SM, SM to MM, SM to higher order mode (herein abbreviated HOM), MM to MM and the like. Furthermore, the disclosed technique is not limited to any particular core diameter, either in the optical fiber input or the optical fiber output of the mode expander isolator. Any combination of core diameters of optical fibers is possible as is any ratio between them.

It will be appreciated by persons skilled in the art that the disclosed technique is not limited to what has been particularly shown and described herein above. Rather the scope of the disclosed technique is defined only by the claims, which follow.

The invention claimed is:

1. Mode expander isolator for a fiber laser amplifier, comprising:
    an optical fiber input, for coupling a first optical fiber with said mode expander isolator;
    an optical fiber output, for coupling a second optical fiber with said mode expander isolator;
    an isolator, positioned between said optical fiber input and said optical fiber output, for preventing back-reflected laser light from reaching said optical fiber input;
    at least one; and
    an optical system designed to match a mode of said optical fiber input to a specific mode of said optical fiber output, wherein said isolator and said at least one lens form a free space mode expander.

2. The mode expander isolator of claim 1, wherein said optical fiber input is for coupling single mode optical fibers.

3. The mode expander isolator of claim 1, wherein said optical fiber output is for coupling large mode area optical fibers.

4. The mode expander isolator of claim 1, wherein said optical system comprises at least one lens selected from the list consisting of:
    fiber lenses;
    ball lenses;
    gradient-index lenses;
    spherical lenses; and
    aspherical lenses.

5. The mode expander isolator of claim 1, wherein said optical system comprises at least one of at least one diffractive element and at least one refractive element for shaping said mode of said optical fiber input to match a specific higher order mode (HOM) of said optical fiber output.

6. The mode expander isolator of claim 1, said isolator comprising an absorber for deflecting said back-reflected laser light from said optical fiber input.

7. The mode expander isolator of claim 1, wherein said isolator is non-polarization maintaining.

8. The mode expander isolator of claim 7, said isolator comprising a Faraday rotator and a plurality of birefringent crystals for deflecting said back-reflected laser light from said optical fiber input.

9. The mode expander isolator of claim 1, wherein said specific mode is a fundamental mode.

10. The mode expander isolator of claim 1, said isolator comprising an aperture around said at least one input lens, for deflecting said back-reflected laser light from said optical fiber input.

11. The mode expander isolator of claim 1, wherein said isolator is polarization maintaining, comprising:
    a Faraday rotator;
    at least one polarizer; and
    at least one beamsplitter, for preventing said back-reflected laser light from reaching said optical fiber input.

12. The mode expander isolator of claim 1, wherein said fiber laser amplifier is a two-stage master oscillator power amplifier.

13. Fiber laser amplifier, comprising:
a laser source;
an amplification stage; and
a mode expander isolator, coupled between said laser source and said amplification stage,
said mode expander isolator comprising:
an optical fiber input, for coupling an optical fiber of said laser source with said mode expander isolator;
an optical fiber output, for coupling an optical fiber of said amplification stage with said mode expander isolator;
an isolator, positioned between said optical fiber input and said optical fiber output, for preventing back-reflected laser light from reaching said optical fiber input;
at least one lens; and
an optical system designed to match a mode of said optical fiber input to a specific mode of said optical fiber output,
wherein said isolator and said at least one lens forms a free space mode expander.

14. The fiber laser amplifier of claim 13, said laser source comprising:
a seeder;
a pumping diode; and
an actively doped optical fiber, coupled with said seeder, said pumping diode and said optical fiber input.

15. The fiber laser amplifier of claim 13, wherein said laser source is selected from the list consisting of:
a Q-switched fiber resonator; and
a gain-switched fiber laser.

16. The fiber laser amplifier of claim 13, said amplification stage comprising:
an isolator;
a pumping diode; and
an actively doped optical fiber, coupled with said isolator, said pumping diode and said optical fiber output,
wherein said isolator and said pumping diode are coupled on opposite sides of said actively doped optical fiber.

* * * * *